UNITED STATES PATENT OFFICE.

LEWIS E. SAUNDERS, OF NIAGARA FALLS, NEW YORK, ASSIGNOR TO NORTON COMPANY, OF WORCESTER, MASSACHUSETTS, A CORPORATION OF MASSACHUSETTS.

COMPOSITION OF MATTER CONTAINING OXIDS OF ALUMINUM AND TITANIUM.

954,767. Specification of Letters Patent. Patented Apr. 12, 1910.

No Drawing. Application filed January 14, 1909. Serial No. 472,347. (Specimens.)

*To all whom it may concern:*

Be it known that I, LEWIS E. SAUNDERS, a citizen of the United States, residing at Niagara Falls, in the county of Niagara and State of New York, have invented certain new and useful Improvements in Composition of Matter Containing Oxids of Aluminum and Titanium, of which the following is a specification.

This invention relates to a composition of matter consisting essentially of alumina and titanium oxid, the latter preferably in relatively small proportions, and either free from oxids of iron and silicon or containing the same only in unimportant proportions. This composition of matter is available for use as an abrasive, as a refractory material for the production of cast or molded articles, and for other purposes. A product having the desired percentage of titanium oxid, $TiO_2$, is readily prepared by thoroughly mixing oxid of aluminum with rutile or other form of titanium oxid, and fusing the mass in an electric furnace into a homogeneous product. This fusion is advantageously effected in a furnace of the type shown in U. S. Patent No. 775,654, granted November 22, 1904, to Aldus C. Higgins. For example, I have prepared a product containing substantially 95.5 per cent. of alumina and 4.5 per cent. of titanium oxid by fusing a mixture containing the substantially pure oxids of aluminum and titanium in approximately these proportions. The product is an exceedingly hard mass having a brown or red-brown color and a vitreous luster. The melting point of this material is rather low as compared with pure alumina, and the material is when molten a good conductor of electricity. A product having 94 per cent. of alumnia and six per cent. of titanium oxid resembles the above in its general characteristics, but is darker in color, and tougher and more massive, being of a less granular or crystalline structure. This product appears to be somewhat more fusible than the preceding, is very hard, and possesses abrasive qualities of a very high order. Higher proportions of titanium oxid than those mentioned may be employed to advantage for certain purposes. This product may of course be prepared by other methods than that herein described, as for example by the fusion of bauxite or other aluminous material containing titanium oxid, such material having been previously treated for the elimination of other constituents such as iron oxid and silica. It is found that even relatively small proportions of such fluxing impurities as the oxids of iron and silicon, and especially the latter, exercise a profound influence on the characteristics of the product, and the present invention does not contemplate the presence in the mass of substantial proportions of these oxids, by which is meant a proportion of either oxid in excess of about one per cent. by weight of the mass.

I claim:

The herein described homogeneous, previously molten material, consisting essentially of the oxids of aluminum and titanium, the same being substantially free from oxids of iron and silicon, and characterized by its hardness and toughness and by its massive structure.

In testimony whereof, I affix my signature in presence of two witnesses.

LEWIS E. SAUNDERS.

Witnesses:
S. F. HALL,
NEIL A. WILSON.